J. M. BLANKENBEKER.
Roller and Harrow.

No. 106,539. Patented Aug. 23, 1870.

Witnesses:
A. Wihlmqvist
L. S. Mabee

Inventor:
J. M. Blankenbeker
Per Munn & Co.
Attorneys.

JOHN M. BLANKENBEKER, OF POWERS' STATION, INDIANA.

Letters Patent No. 106,539, dated August 23, 1870.

IMPROVEMENT IN COMBINED HARROW AND ROLLER.

The Schedule referred to in these Letters Patent and making part of the same

*To all whom it may concern:*

Be it known that I, JOHN M. BLANKENBEKER, of Powers' Station, in the county of Jay and State of Indiana, have invented a new and useful Improvement in Combined Harrow and Roller; and I do hereby declare that the following is a full, clear, and exact description thereof, which will enable others skilled in the art to make and use the same, reference being had to the accompanying drawing forming part of this specification, in which—

Similar letters of reference indicate corresponding parts.

My invention has for its object to furnish an improved harrow, which shall be so constructed that the ground may be harrowed and rolled, or harrowed, rolled, and cultivated, as may be desired, and which shall, at the same time, be simple in construction and easily adjusted and operated; and It consists in the construction and combination of various parts of the machine, as hereinafter more fully described.

A is the tongue, the rear end of which is hinged to the forward end of the short bar B, which passes through a clevis, $d'$, attached to the forward end of the draw-bar D.

Figure 1:
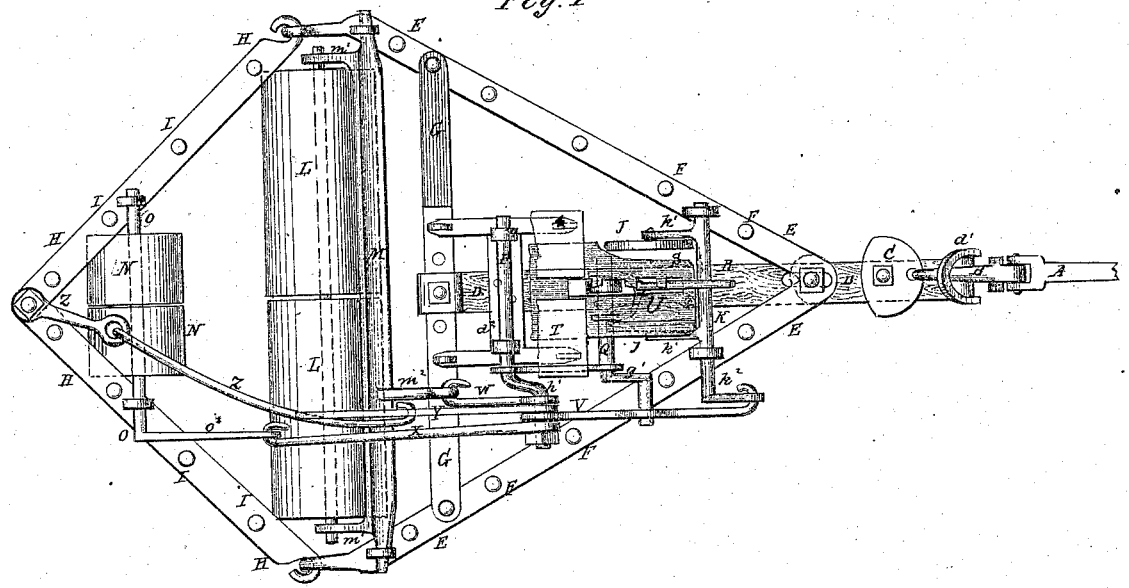
Figure 1 is a top view of my improved harrow and roller, part of the seat being broken away to show the construction.
Figure 2:
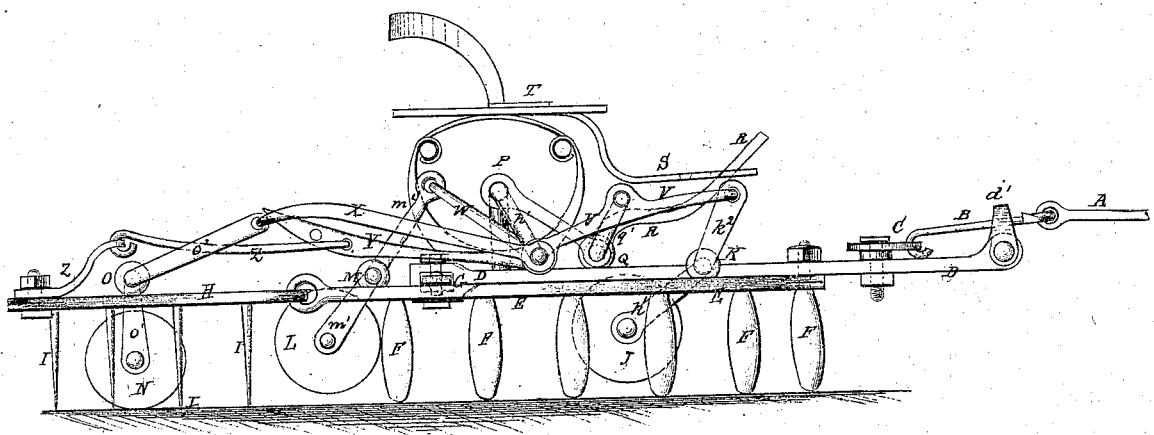
Figure 2 is a side view of the same.

The rear end of the short bar B has a hook formed upon it, which hooks into a hole formed in the forward edge of the plate C, which is pivoted to the forward part of the draw-bar D, by a bolt, as shown in figs. 1 and 2.

E are the side bars of the forward part of the harrow-frame, the forward ends of which are pivoted to the forward part of the draw-bar D, by a bolt, or by the upper end of the forward tooth.

To the bars E, at suitable distances apart, are secured the harrow-teeth F, which are made broad and thin, or paddle-shaped, as shown in fig. 2, and are secured to the bars E with their longest diameters parallel with the line of draft.

The rear parts of the side bars E are adjustably connected to each other by the cross-bars G, the outer ends of which are pivoted to the rear parts of the side bars E, and the inner ends of which overlap each other, pass through a slot or keeper formed in or attached to the rear end of the draw-bar D, where they are adjustably secured in place by a bolt which passes through a hole in the said rear end of the said draw-bar D, and through one or the other of the holes through the inner ends of the cross-bars G. By this construction the frame of the harrow may be spread or contracted, as desired.

Upon the rear ends of the side-bars E are formed eyes, into which are hooked hooks formed upon the forward ends of the side-bars H of the rear part of the harrow-frame. The rear ends of the bars H are secured to each other by a bolt, as shown in figs. 1 and 2.

To the bars H, at suitable distances apart, are secured the teeth I, which are made a little narrower and more pointed than the teeth F, and are secured to the bars H with their longest diameters at right angles with the line of draft, so as to act as cultivator-teeth when required.

J are wheels, which are pivoted to the ends of the downwardly-projecting arms $k^1$ of the crank-shaft K, which works in bearings attached to the bars E, and upon one end of which is formed a crank-arm, $k^2$.

L is the forward or main roller, which may be made in one or more parts, and the ends of the shaft of which are attached to the downwardly-projecting arms $m^1$ of the shaft M, which works in bearings attached to the rear parts of the bars E, and to which is rigidly attached, or upon it is formed, an upwardly-projecting arm, $m^2$.

N is the rear roller, the ends of the shaft of which are attached to the ends of the downwardly-projecting arms $o^1$, attached to the shaft O, the journals of which work in bearings attached to the rear parts of the bars H, and to one of its ends is attached, or upon it is formed, a crank, $o^2$.

P is a crank-shaft, which works in bearings in the upper ends of standards attached to a plate, $d^2$, bolted to the draft-bar of the harrow, and to one end of which shaft is attached, or upon it is formed, a crank, $p'$.

Q is a crank-shaft working in bearings attached to the draft-bar D, and with which is rigidly connected the lower end of the lever R, which passes through a slot in the foot-board S of the seat T, where it is held in place, when adjusted, by being forced into and held in one or the other of the notches formed in the side of the said slot by the spring U.

Upon one end of the shaft Q is formed, or to it is attached, a crank, $q'$, which is connected with the cranks $k^2$ and $p'$, by the connecting-bar V.

The crank $p'$ is connected with the crank $m^2$ by the connecting-bar W, and with the crank $o^2$ by the connecting-bar X, so that, by operating the lever R, the wheels and rollers may be lowered to regulate the depth at which the teeth work in the ground, or to raise said teeth entirely away from the ground when passing from place to place.

Y is a lever, the lower end of which is pivoted to the crank $p'$, and with the middle part of which is adjustably connected the forward end of the jointed connecting-bar Z, the rear end of which is secured to the rear ends of the side bars H by the same bolt that secures said bars to each other, so that the driver, by means of the lever Y, can raise the rear part of the harrow away from the ground, for convenience in turning, or when he does not desire to cultivate the ground, but only to harrow and roll it.

This construction also enables the rear part of the harrow to be detached from the forward part when desired. The rollers may also be detached when desired.

Having thus described my invention,

What I claim as new, and desire to secure by Letters Patent, is—

The arrangement, in a combined harrow and roller, of side bars E, teeth F, adjustable cross-bar G, side bars H, teeth I, roller L, armed shaft M, roller N, armed shaft O, wheels J, armed shaft K, lever R, crank-shafts Q q P p', connecting-bars V W X, lever Y, and bar Z, operating as described.

JOHN M. BLANKENBEKER.

Witnesses:
ABRAHAM MORRICAL,
B. JOHNSON.